Patented Apr. 12, 1938

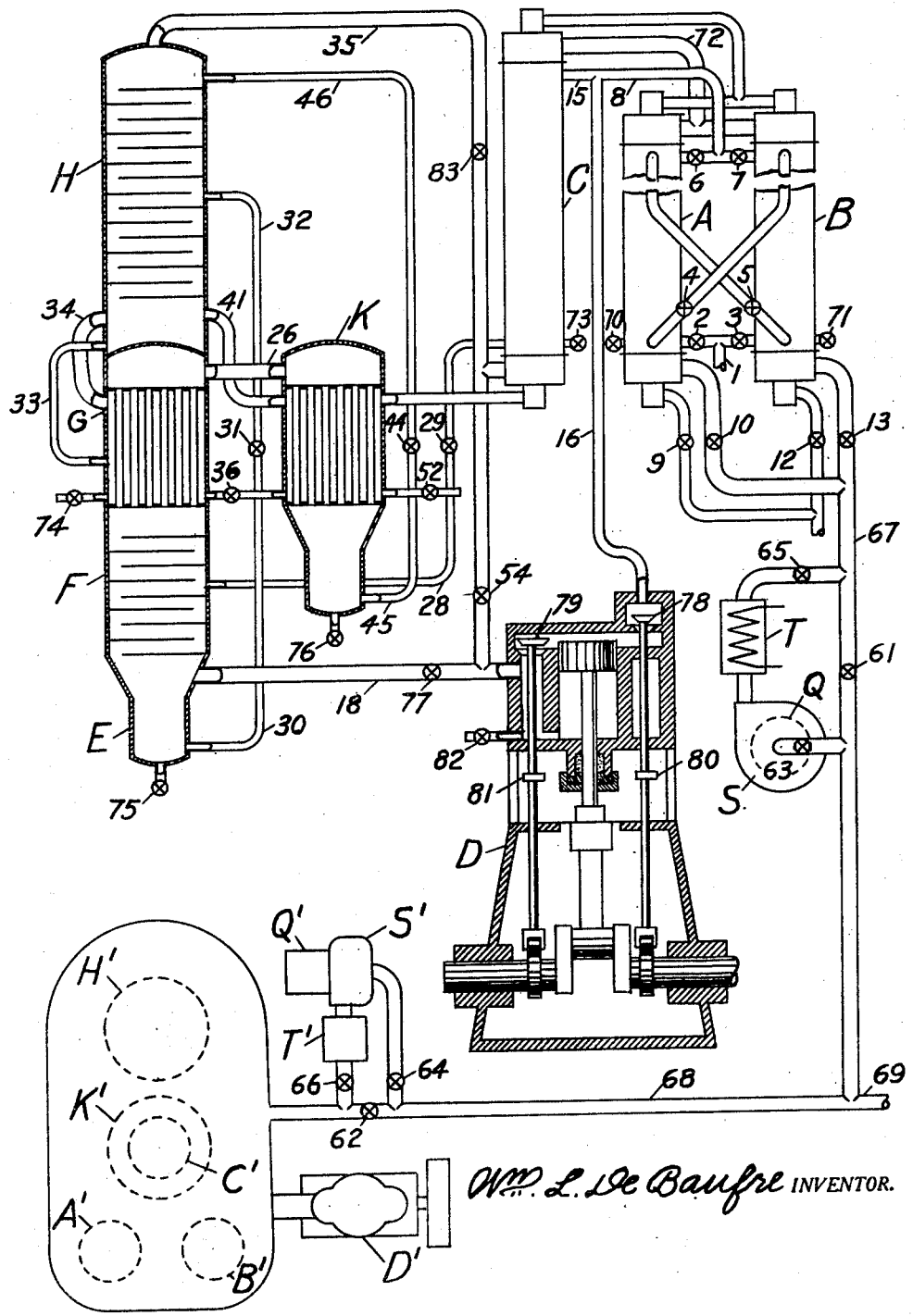

2,113,680

UNITED STATES PATENT OFFICE 2,113,680

METHOD AND APPARATUS FOR DEFROSTING AIR SEPARATION PLANTS

William Lane De Baufre, Lincoln, Nebr.

Application August 16, 1935, Serial No. 36,551

12 Claims. (Cl. 62—175.5)

This invention relates to the art of liquefying and separating gases below atmospheric temperature in plants where moisture collects as frost during normal operation and it is necessary to interrupt normal operation at intervals in order to defrost the various parts of the plants. The invention is particularly applicable to plants for rectifying atmospheric air into more or less pure oxygen and nitrogen, as atmospheric air always contains moisture. A fraction of such moisture accumulates as frost in the rectifier, the expansion engine and the heat exchangers of such plants even when chemical drying of the air is resorted to before the air is subjected to the separation process.

Heretofore, such plants have been defrosted by blowing through them air from the compressor for supplying the compressed air to be processed during normal operation. The air for defrosting has followed the same path through the plant as the compressed air during normal operation. Before entering the plant, the air for defrosting has been heated and various drain valves on the plant have been opened until warm air issued therefrom. Since less air was desired for defrosting than was supplied for processing during normal operation, a large portion of the air handled by the compressor has usually been wasted because the compressors have rarely been arranged to operate continuously below normal speed or otherwise with reduced capacities. With a small air separation plant as usually employed in making oxygen for cutting and welding purposes, the waste of power in running the compressor at full speed during defrosting is not so objectionable at it would be with large plants for supplying oxygen for gas making or for metallurgical furnaces.

One object of the present invention is to reduce waste of power in defrosting an air separation plant.

Another object of the invention is to increase the thoroughness of the defrosting operation.

Another object of the invention is to decrease the period of time required to defrost an air separation plant.

Another object of the invention is to enable the rectifier of an air separation plant to be operated continuously over long periods of time.

The foregoing, together with such other advantages as hereinafter appear or are incident to the invention, are realized by the construction illustrated in preferred form in the drawing, which shows a schematic arrangement of air separation plants including means for defrosting them.

Two air separation plants are shown in the drawing. One plant is shown in considerable detail in order to describe the steps in the defrosting process. The other plant is shown only in sufficient detail to describe its relation to the first air separation plant during the defrosting process. In both plants, we have two interchangers A and B, a liquefier C, an exchanger K, a rectifying column H, an expansion engine D, and a blower S with motor Q and heater T, these letters being marked with primes in the second plant.

The normal operation of these air separation plants will not be described in detail because we are here interested in the process of defrosting them rather than in their normal operation. In designating the various parts of these plants, the same letters and figures have been used as in U. S. Patent No. 1,951,185, issued March 13, 1934. Reference may be made to this patent for a description of the normal operation of the plants shown in the drawing of the present application.

As a foundation for some of the claims in this application, however, it may be said that during normal operation, compressed air enters pipe 1 and flows through the compressed air spaces within interchangers A and B where it is cooled by heat transfer to returning products of rectification, more or less pure oxygen and nitrogen, flowing through the oxygen and nitrogen spaces therein respectively. One portion of the cooled compressed air is expanded through engine D. Another portion of the cooled compressed air enters liquefier C where it is more or less liquefied by heat transfer to returning oxygen and nitrogen flowing through the oxygen and nitrogen spaces therein. The more or less liquefied portion of compressed air is throttled into the lower part F of rectifier H. The expanded portion also enters the lower part of the rectifier where the preliminary stage of rectification occurs. The final stage of the two-stage rectification occurs in the upper part of the rectifier from which more or less pure oxygen and nitrogen return through liquefier C and interchangers A and B.

During normal operation of the two air separation plants shown in the drawing, more or less pure nitrogen leaves the plants through nitrogen return pipes 67 and 68 respectively and is discharged through the common nitrogen main 69 into which other air separation plants not shown may also discharge their waste nitrogen. This waste nitrogen is almost free of water vapor by reason of having been cooled to nearly two hundred degrees below zero centigrade in the process of rectifying the air which has been separated into oxygen and nitrogen.

It is proposed to use this moisture free nitrogen for defrosting rather than employ moisture saturated air from the compressors for supplying compressed air to the air separation plants. Even without heating, such moisture free gas would have considerable avidity for absorbing water vapor. But the operation of compressing this nitrogen in order to blow it through a plant will raise its temperature above atmospheric temperature. Further heating may be applied to increase the heat energy available for raising the temperature of cold metal parts of the plant above room temperature and for evaporating frost adhering thereto.

It is further proposed to blow this warm dry nitrogen into the air separation plants through their nitrogen outlet pipes in a reverse direction to the flow of nitrogen discharged therefrom during normal operation. This is proposed because ample cross-sectional area for flow of nitrogen from the rectifying column through the liquefier and interchangers is generally provided to give a small pressure drop with a large flow of nitrogen at about atmospheric pressure. Consequently, the warm dry nitrogen will encounter little frictional resistance in flowing into the coldest parts of the air separation plant to defrost it. Also, no special defrosting pipe connections are required, which would increase heat leak into cold parts of the apparatus during normal operation. By means of one special cross-over pipe not required during normal operation, the whole plant may be directly reached by the flow of warm dry nitrogen and thereby thoroughly defrosted.

It is proposed to apply this method of defrosting to two or more air separation units, utilizing in each unit while shut down for defrosting, dry nitrogen discharged from the remaining units in normal operation. But even when the remaining units are not in normal operation or there is a single unit only, the method of defrosting by blowing atmospheric air into the plant through the nitrogen outlet pipe is superior to the usual method of forcing atmospheric air into the plant through the compressed air inlet pipe.

Referring to the drawing, assume the air separation plant in the lower left hand corner to be in normal operation, discharging moisture free nitrogen through pipe 68 into main 69, valves 64 and 66 being closed and valve 62 open. Assume that the other air separation plant shown in detail, has been shut down and accumulated liquefied gases drained therefrom. Close valve 61 and open valves 63 and 65. Then start blower S and turn on heat in heater T. Dry nitrogen will then be withdrawn from main 69, compressed and heated by compression in blower S, further heated in heater T, and then discharged into the separation plant through pipe 67 in the reverse direction to the flow of nitrogen through pipe 67 during normal operation.

Valves 10 and 13 being open, the warm dry nitrogen will flow up through most of the tubes within interchangers A and B. These interchangers will be warmed to the temperature of the warm dry nitrogen and any frost therein melted. Such frost will not be in the nitrogen space within the tubes through which the warm dry nitrogen is flowing, but will be in the compressed air space outside of these tubes. The resulting water may be drained out of the compressed air spaces through valves 70 and 71.

The dry nitrogen will continue its course through pipe 72 and through most of the tubes within liquefier C. When interchangers A and B have become warmed, the dry nitrogen leaving them will remain warm, and liquefier C will then be warmed. No frost will exist in the nitrogen space within the tubes in liquefier C, but frost will be found in the compressed air space outside these tubes. Such frost will be melted and may be drained out of liquefier C through valve 73.

Continuing its course, the dry nitrogen will flow through pipe 35 (assuming valve 54 closed and valve 83 open) to the top of rectifier H. With valves 31 and 44 closed and drain valves 52 and 74 open, the dry nitrogen will flow down through the trays indicated in the upper section of rectifier H, through pipes 33, 34 and 41 to the spaces surrounding the tubes in vaporizer G and exchanger K. These parts of the rectifier will be dried and warmed when the dry nitrogen leaving liquefier C becomes warm.

By opening valves 31 and 44, warm dry nitrogen may be discharged from upper section H to lower section F of the rectifier. A more direct path for flow of warm dry nitrogen is provided from liquefier C to lower section F, however, by opening special by-pass valve 54. Assuming the valves in the expansion engine to be closed and drain valves 75 and 76 to be open, this warm dry nitrogen will defrost lower section F of the rectifier and the spaces not previously defrosted within vaporizer G and exchanger H.

To defrost engine D, valve 77 is closed. Inlet and outlet valves 78 and 79 are blocked open. This can readily be done by placing distance pieces 80 and 81 between the valve stems and the tappet rods as shown. The warm dry nitrogen will then flow through the expansion engine from outlet to inlet, thence through pipes 16, 15 and 8, through valves 6 and 7, and finally through drain valves 70, 71 and 73. The defrosting of liquefier C and interchangers A and B will thereby be completed as well as engine D. By opening drain valve 82, the lower part of engine D is warmed and dried.

When the nitrogen blowing from all drain valves feels warm, this indicates that all frost has been melted and drained out as water or vaporized and blown out in the moisture laden nitrogen. Any further vaporization of ice or water at any point within the plant would result in cooling the nitrogen at that point with the result that the nitrogen blowing from a nearby drain valve would not feel warm.

Blower Q is preferably of the centrifugal type which does not require internal lubrication and therefore does not affect the dryness of the nitrogen compressed. A positive displacement type of compressor may, however, be used. Heater T may supply the additional rise in temperature by means of hot water, steam, or electrical energy.

Instead of using a separate blower and heater for each separation unit as shown in the drawing, a single blower and heater may be employed to withdraw dry nitrogen from main 69 and discharge it through a manifold to any separation unit to be defrosted.

The dry nitrogen from a single unit air separation plant might be stored and later utilized for defrosting the plant. Usually, however, it would be preferable to utilize atmospheric air instead of storing nitrogen. Such atmospheric air would need to be heated after compression because it would be at or near the moisture saturation point due to compression. In flowing through a cold plant, such atmospheric air would be cooled below the dew point and deposit moisture therein. In parts of the plant, it would be cooled below the freezing point and deposit frost therein. Consequently, in employing atmospheric air for defrosting, conditions with regard to moisture and frost are first made worse within the plant before they are improved. This would not be true in using dry nitrogen for defrosting. Accumulated frost would immediately begin to vaporize into the dry nitrogen even in the coldest parts of the plant.

In defrosting an air separation plant with compressed atmospheric air, moisture is thus deposited in the rectifier and other parts of the plant where little frost tends to accumulate during normal operation. This necessitates defrosting the whole plant although it is mainly the liquefier C and engine D that needed defrosting. By using dry nitrogen, liquefier C and engine D may be heated to or above room temperature and rectifier H permitted to remain cold without any danger of depositing moisture therein, particularly by passing the dry nitrogen through the nitrogen spaces within the interchangers and the liquefier as proposed herein. Frost in rectifier H will be absorbed by the dry nitrogen and carried out of the rectifier while the rectifier is still below freezing temperature. By stopping the defrosting operation before the rectifier has been warmed to room temperature refrigeration is conserved in recooling the rectifier to operating temperature.

By closing valve 83 in pipe 35, valve 77 in pipe 18 and valve 29 in pipe 28, interchangers A and B, liquefier C and engine D may be defrosted in the manner previously explained without defrosting rectifier H. In doing so, accumulated liquefied gases may be permitted to remain within the rectifier. As soon as liquefier C and engine D have been defrosted, they may be cooled to operating temperatures and the plant put into normal operation again with very little loss of time. In this way, liquefier C and engine D may be defrosted more frequently than rectifier H.

By providing means for defrosting the interchangers, liquefier and expansion engine of an air separation plant without warming up the rectifier, it becomes possible to provide two sets of interchangers, liquefier and expansion engine for one rectifier and keep the rectifier in continuous operation by alternately defrosting and cooling down the two sets of interchangers, liquefier and expansion engine.

I claim:

1. Method of defrosting air separation plant with interchangers for cooling and liquefier for partly liquefying said air by heat transfer to separated oxygen and nitrogen and a rectifier for separating said air into oxygen and nitrogen, including blowing a warm gas through the nitrogen spaces in said interchangers and said liquefier and thence into said rectifier through the nitrogen outlet pipe therefrom and discharging moisture laden gas from said rectifier.

2. Method of defrosting air separation plant with interchangers for cooling and liquefier for partly liquefying said air by heat transfer to separated oxygen and nitrogen and a two-stage rectifier having preliminary and final stages for separation of said air into oxygen and nitrogen, including blowing a warm gas through the nitrogen spaces in said interchangers and said liquefier and thence into the preliminary stage of said rectifier and discharging moisture laden gas from the preliminary stage of said rectifier.

3. Method of defrosting air separation plant with interchangers for cooling and liquefier for partly liquefying said air by heat transfer to separated oxygen and nitrogen and an engine for expanding a portion of said air, including blowing a warm gas through the nitrogen spaces in said interchangers and said liquefier and thence through said expansion engine.

4. Apparatus for defrosting air separation plant including a nitrogen outlet pipe from said plant, a valve for closing the nitrogen outlet pipe, a source of nitrogen connected to the nitrogen outlet pipe beyond said valve, a blower for withdrawing gas from the nitrogen outlet pipe beyond said valve, compressing said gas and discharging it into the nitrogen outlet pipe on the other side of said valve whereby said gas is forced into said plant through the nitrogen outlet pipe.

5. Apparatus for defrosting air separation plant as in claim 4 including means for heating said gas.

6. In an air separation plant having an interchanger for cooling moist air to be separated by heat exchange through heat transferring surfaces to the separated products and a rectifier for separating the air into said products, apparatus for defrosting said air separation plant including a nitrogen outlet pipe from said interchanger, a source of gas external to said air separation plant, means for warming said gas, and a blower for forcing said warm gas into said plant through said nitrogen outlet pipe, whereby frost deposited on the heat transferring surfaces in cooling the moist air to be separated is vaporized and the surfaces dried by heat transfer from the warm gas flowing through the nitrogen spaces within said interchanger.

7. Apparatus for defrosting air separation plant including multiple air separation units, a common nitrogen outlet pipe from said units, and means for withdrawing nitrogen from said common nitrogen outlet pipe and blowing said nitrogen through one of said units.

8. Apparatus for defrosting air separation plant including multiple air separation units with nitrogen outlet pipes joined to a common main and means for producing a reversed flow of gas from said common main through one of said nitrogen outlet pipes.

9. Apparatus for defrosting a plant for rectification of gaseous mixtures below room temperature including multiple rectification units and means for blowing through one of said units a product of rectification from another of said units.

10. Apparatus for defrosting a plant for rectification of gaseous mixtures, below room temperature as in claim 9 including means for warming said product of rectification.

11. In an air separation plant having an interchanger for cooling moist air to be separated and a liquefier for liquefying part of the cooled air by heat exchange through heat transferring surfaces to the separated products, an engine for expanding another part of the cooled air, and a rectifier for separating the liquefied and expanded air into said products, apparatus for defrosting said air separation plant including a source of gas external to said air separation plant, means for warming said gas, a blower for forcing said warm gas through said air separation plant, means for shutting off said rectifier from said interchanger, liquefier and engine, and a crossover pipe from said liquefier to said engine, whereby said interchanger, liquefier and engine can be defrosted without warming said rectifier by flow of said warm gas through said interchanger, liquefier and engine without flowing through said rectifier.

12. In an air separation plant as in claim 11, additional apparatus for defrosting said air separation plant including a nitrogen outlet pipe from said interchanger and means for forcing said warm gas into said air separation plant through said nitrogen outlet pipe, whereby frost deposited on the heat transferring surfaces in cooling the moist air to be separated is vaporized and the surfaces dried by heat transfer from the warm gas flowing through the nitrogen spaces within said interchanger.

WILLIAM LANE DE BAUFRE.